(12) United States Patent
Jeffers et al.

(10) Patent No.: US 12,551,838 B2
(45) Date of Patent: Feb. 17, 2026

(54) MODULAR PRESSURE-SWING ADSORPTION SYSTEM

(71) Applicant: Generon IGS, Inc., Houston, TX (US)

(72) Inventors: Thomas J. Jeffers, Spring, TX (US); Steven Reese, Humble, TX (US)

(73) Assignee: Generon IGS, Inc., Houston, TX (US)

( * ) Notice: Subject to any disclaimer, the term of this patent is extended or adjusted under 35 U.S.C. 154(b) by 373 days.

(21) Appl. No.: 18/386,014

(22) Filed: Nov. 1, 2023

(65) Prior Publication Data

US 2024/0149209 A1 May 9, 2024

Related U.S. Application Data

(60) Provisional application No. 63/422,475, filed on Nov. 4, 2022.

(51) Int. Cl.
*B01D 53/04* (2006.01)
*B01D 53/047* (2006.01)
*C01B 13/02* (2006.01)

(52) U.S. Cl.
CPC ....... *B01D 53/0446* (2013.01); *B01D 53/047* (2013.01); *B01D 53/0415* (2013.01); *B01D 2253/102* (2013.01); *B01D 2253/116* (2013.01); *B01D 2256/10* (2013.01); *B01D 2257/104* (2013.01); *B01D 2258/06* (2013.01); *B01D 2259/402* (2013.01); *C01B 13/0259* (2013.01)

(58) Field of Classification Search
None
See application file for complete search history.

(56) References Cited

U.S. PATENT DOCUMENTS

| 4,826,510 | A | * | 5/1989 | McCombs | B01D 53/0407 55/357 |
| 5,827,354 | A | * | 10/1998 | Krabiell | B01D 53/047 96/147 |
| 8,152,910 | B2 | * | 4/2012 | Zanni | B01D 53/0446 96/147 |
| 9,573,092 | B2 | * | 2/2017 | Pruneri | B01D 53/047 |
| 9,844,749 | B2 | * | 12/2017 | Billiet | B01J 20/08 |

* cited by examiner

*Primary Examiner* — Gabriel E Gitman
(74) *Attorney, Agent, or Firm* — William H. Eilberg

(57) ABSTRACT

A pressure-swing adsorption (PSA) system includes a plurality of substantially similar pairs of towers, each tower containing adsorbent material for separating a gas into components. Each tower has a top header and the bottom headers, the headers being connected to extensions which define conduit segments. When a new pair of towers is placed alongside an existing pair of towers, the conduit segments are aligned to define longer conduits spanning all of the pairs of towers. Thus, the longer conduits can be used to direct gas into towers from all of the pairs, and to withdraw product gas from towers in all of the pairs. The capacity of the PSA system can thus be easily expanded or reduced. Some or all of the piping used to direct gas to and from the towers is replaced by one or more control blocks, which define passages for gas flow.

17 Claims, 19 Drawing Sheets

MODULAR PRESSURE-SWING ADSORPTION SYSTEM

CROSS-REFERENCE TO RELATED APPLICATION

Priority is claimed from U.S. provisional patent application Ser. No. 63/422,475, filed Nov. 4, 2022, the entire disclosure of which is hereby incorporated by reference herein.

BACKGROUND OF THE INVENTION

The present invention relates to the field of non-cryogenic separation of gases into components, and provides an improved pressure-swing adsorption (PSA) system and method.

A pressure-swing adsorption (PSA) process works by directing a gas into a pressurized chamber which houses a material which tends to adsorb one of the components of the gas. The component or components which are not adsorbed pass through the chamber, and can be collected as a product gas. When pressure in the chamber is reduced to ambient, the adsorbed gas component becomes dislodged from the material, and that component can also be withdrawn, either as another product gas or as waste. The process by which the gas component becomes dislodged from the material is known as regeneration. After regeneration, the adsorbent material is ready for the next cycle of adsorption.

The chamber in which the PSA process is conducted typically has the form of a cylinder, arranged vertically so as to define a tower. In this description, the chamber will often be identified as a tower.

Typically, a PSA process is operated with a pair of chambers or towers, wherein one of the towers is pressurized, while the other tower is being depressurized. The adsorption of a component occurs in the pressurized chamber, while the adsorbed component becomes dislodged from the material in the unpressurized chamber. Periodically, the roles of the chambers are reversed, so that adsorption occurs in one chamber while regeneration occurs in the other chamber. In this way, it is possible to produce a substantially continuous stream of product gas.

A typical example of the use of a PSA process is in the separation of air into components. The adsorbent material can be a carbon molecular sieve (CMS), which has a distinctive pore structure such that it selectively adsorbs oxygen and other trace gases in the compressed air stream. Nitrogen molecules are too large to be adsorbed by the CMS, so the nitrogen in the air passes through the adsorber bed and exits the chamber as a product gas.

At the end of each adsorption cycle, the inlet, outlet and exhaust valves on both beds are closed, and upper and lower equalization valves are opened to allow the pressure to equalize between the beds in the two chambers. This pressure equalization phase conserves energy and improves efficiency by transferring a portion of compressed air to the bed that is entering the adsorption cycle.

Once the beds have been equalized, the bed entering the regeneration cycle is depressurized, causing the oxygen that has collected on the CMS to be released and vented to the atmosphere (or collected for later use). During the regeneration cycle, a small stream of nitrogen from the producing bed is injected into the top of the regenerating bed. This stream of produced nitrogen is used to purge the remaining oxygen from the CMS, as the bed completes its regeneration. The regenerated bed is then re-pressurized and returned to an adsorption cycle, by using a controlled flow of nitrogen gas from a nitrogen buffer vessel and a controlled flow of incoming compressed air.

One disadvantage of PSA systems of the prior art is that it is difficult to change the capacity of the system. It is often desired to increase the capacity, and sometimes a user may wish to decrease the capacity. In the prior art, the only way to increase the capacity of the system is to provide a larger chamber for treating the incoming gas.

The present invention solves the problem of modifying the capacity of a PSA system, by providing a PSA system having modular construction. The system of the present invention enables a user easily to add, or subtract, pairs of chambers for conducting a PSA process.

The present invention also provides improvements to the efficiency of the PSA process, by replacing conduits with control blocks, and thereby reducing the amount of gas that is located outside the PSA chambers at any given time.

The present invention also makes it feasible to use cylindrical chambers having an almost unlimited assortment of sizes, without regard to customary limitations imposed by extrusion processes.

SUMMARY OF THE INVENTION

The present invention comprises a pressure-swing adsorption (PSA) system which is of modular construction, such that the system can be easily expanded or reduced in size.

In particular, the system includes a plurality of pairs of substantially similar towers, each tower containing an adsorbent material to which a component of a feed gas becomes adsorbed under pressure, and means for directing gases into, and out of, each pair of towers, depending on which tower is being pressurized and which tower is being depressurized.

Each tower has a top header and a bottom header, the headers having extensions which define conduit segments. When a given pair of towers is connected to another pair of towers, the conduit segments are aligned so as to form a longer conduit spanning all of the pairs of towers. Thus, a feed gas can be directed through the conduit so as to flow, in parallel, into one tower of every pair. And a product gas can be withdrawn from a tower of every pair, flowing in an outlet conduit which spans all of the tower pairs.

Each tower includes a tension rod, positioned inside the tower and being connected between the top and bottom headers, such that the tension rod pulls the headers towards each other and thereby provides a tight seal for the tower.

Also, each tower is further sealed by gaskets which seal a connection between each tower and its top and bottom headers, such that each tower is sealed independently from the other towers. Thus, the towers of a given pair can be removed or re-attached without disturbing the seals of the other pairs of towers.

The PSA system also includes means for directing gases into and out of the assembly of pairs of towers. In the prior art, such means include a plurality of pipes located external to the towers. In the present invention, such pipes are replaced by control blocks, each block being preferably of metal construction and having passages formed in the block so as to provide paths for gas flow. This arrangement substantially reduces the amount of gas which resides outside the towers at any given time, and therefore increases the efficiency of the PSA system.

Preferably, there is one control block for the feed gas, and one control block for the product gas.

The invention also includes a method of modifying the size of a PSA system. The method includes positioning a new pair of towers alongside an existing pair of towers, while aligning the conduit segments of each pair so as to define longer conduits for directing gas to and from the pairs of towers. The process of adding pairs of towers can be repeated with further pairs, so as to expand the system as much as desired. The process can also be practiced in reverse, by removing pairs of towers from the system.

The method can also be practiced by first removing a pair of towers located at an end of the PSA system, then adding one or more pairs of towers, and finally replacing the pair that was initially removed. This variation is useful where the end pairs of towers have feet for enabling the system to stand stably on a surface. In this variation, the feet remain on the end pair of towers.

The present invention therefore has the primary object of providing a modular pressure-swing adsorption (PSA) system.

The invention has the further object of making it easy to increase, or decrease, the capacity of a PSA system.

The invention has the further object of improving the efficiency of operation of a PSA system.

The invention has the further object of replacing some or most of the piping used in a PSA system, with one or more control blocks which provide passages for gas flow.

The invention has the further object of minimizing the amount of gas that is located, at any given time, outside the towers used to conduct a PSA process.

The person skilled in the art will recognize other advantages of the present invention, from a reading of the following brief description of the drawings, the detailed description of the invention, and the appended claims.

DETAILED DESCRIPTION OF THE INVENTION

The present invention comprises a PSA system which has a modular construction, such that the size of the system can be easily increased or reduced by simple attachment or removal of modules.

Figure 10:
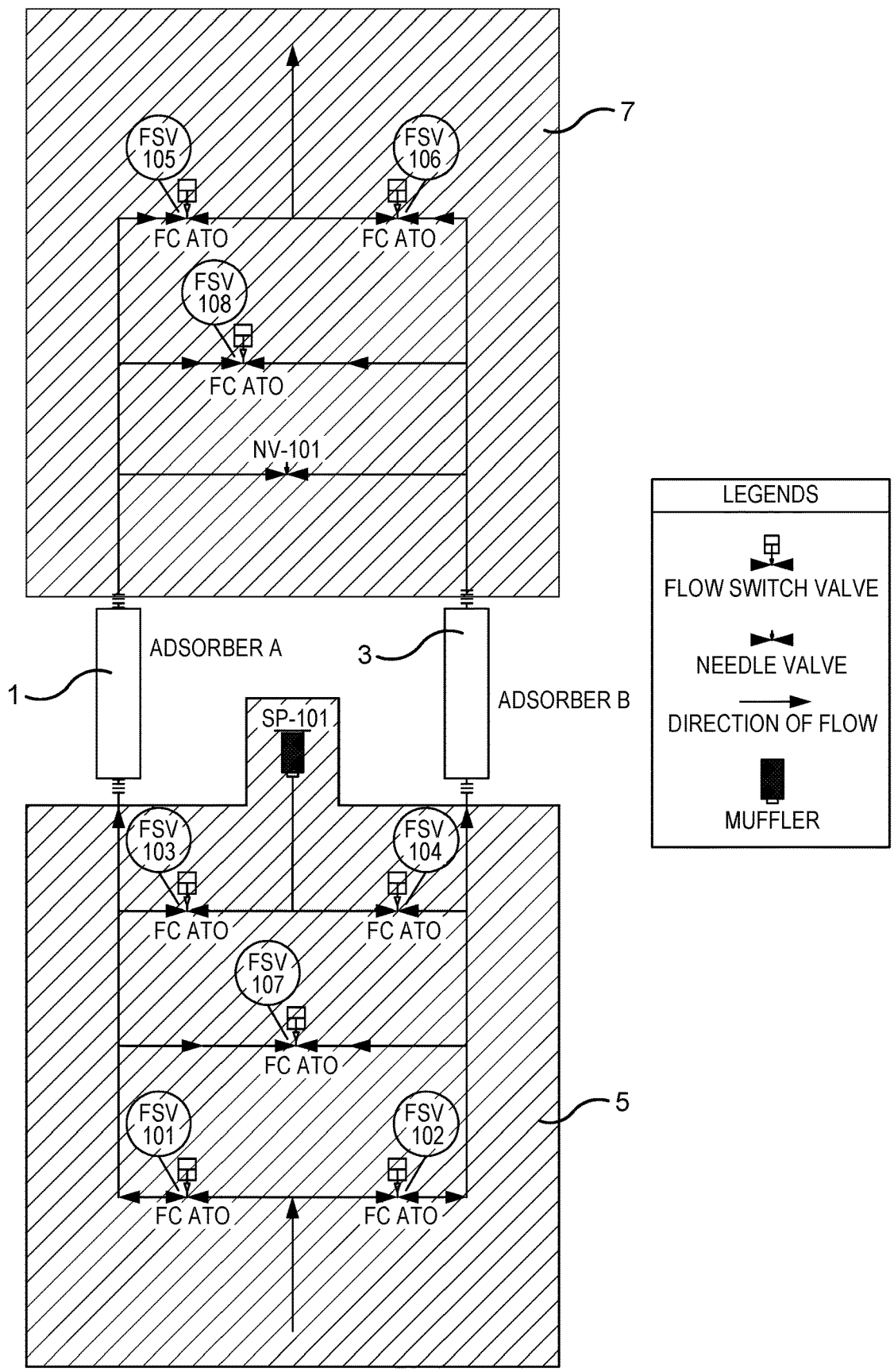
FIG. 10 provides a simplified schematic diagram of the modular PSA system of the present invention.

The simplified schematic diagram of FIG. 10, which applies both to the present invention and to prior art PSA systems, shows a pair of chambers 1, 3, labeled "Adsorber A" and "Adsorber B". These chambers include an adsorbent material, such as the carbon molecular sieve (CMS) material discussed above. The choice and composition of the adsorber material are known in the prior art, and do not themselves form part of the present invention. In this description, it is assumed that each chamber contains the necessary adsorbent material to conduct the desired gas separation process.

As explained above, a PSA process is preferably performed with a pair of chambers, as shown in FIG. 10. When one chamber is pressurized by introduction of a feed gas, one of the components of the feed gas becomes adsorbed onto the adsorbent material, and the other component(s) can continue to pass through the chamber as a product gas. When the chamber is depressurized, the adsorbed component is released, and can then be removed from the chamber.

The system is operated such that at a time when Adsorber A (item 1) is pressurized, Adsorber B (item 3) is depressurized and thereby regenerated, and vice versa. That is, when one adsorber is producing, the other adsorber is being regenerated. The roles of the two adsorbers are periodically reversed. In this way, it is possible to provide a substantially continuous flow of product gas.

Typically, the feed gas is introduced at the bottom of the chamber, and the product gas is withdrawn at the top of the chamber. However, this configuration could be changed, if desired.

A common use of a PSA system is the separation of air into streams of oxygen and nitrogen. In this case, the shaded region 5 relates to air control, namely the control of air flowing into the chambers, and the shaded region 7 relates to nitrogen control, namely the control of the product nitrogen gas flowing out of the chambers. In this specification, the feed gas will be often be identified as air, and the component gases as oxygen and nitrogen. But it should be understood that the invention can be used with other gases having separable components.

The capacity of a PSA system can be increased by increasing the size of the chambers, or by providing more pairs of chambers. In the latter case, the pairs of chambers are preferably connected in parallel, so that a feed gas can be fed simultaneously to one chamber of each pair. The present invention provides pairs of chambers having modular construction.

The modular construction is best illustrated in FIGS. 1-5.

Figure 1:
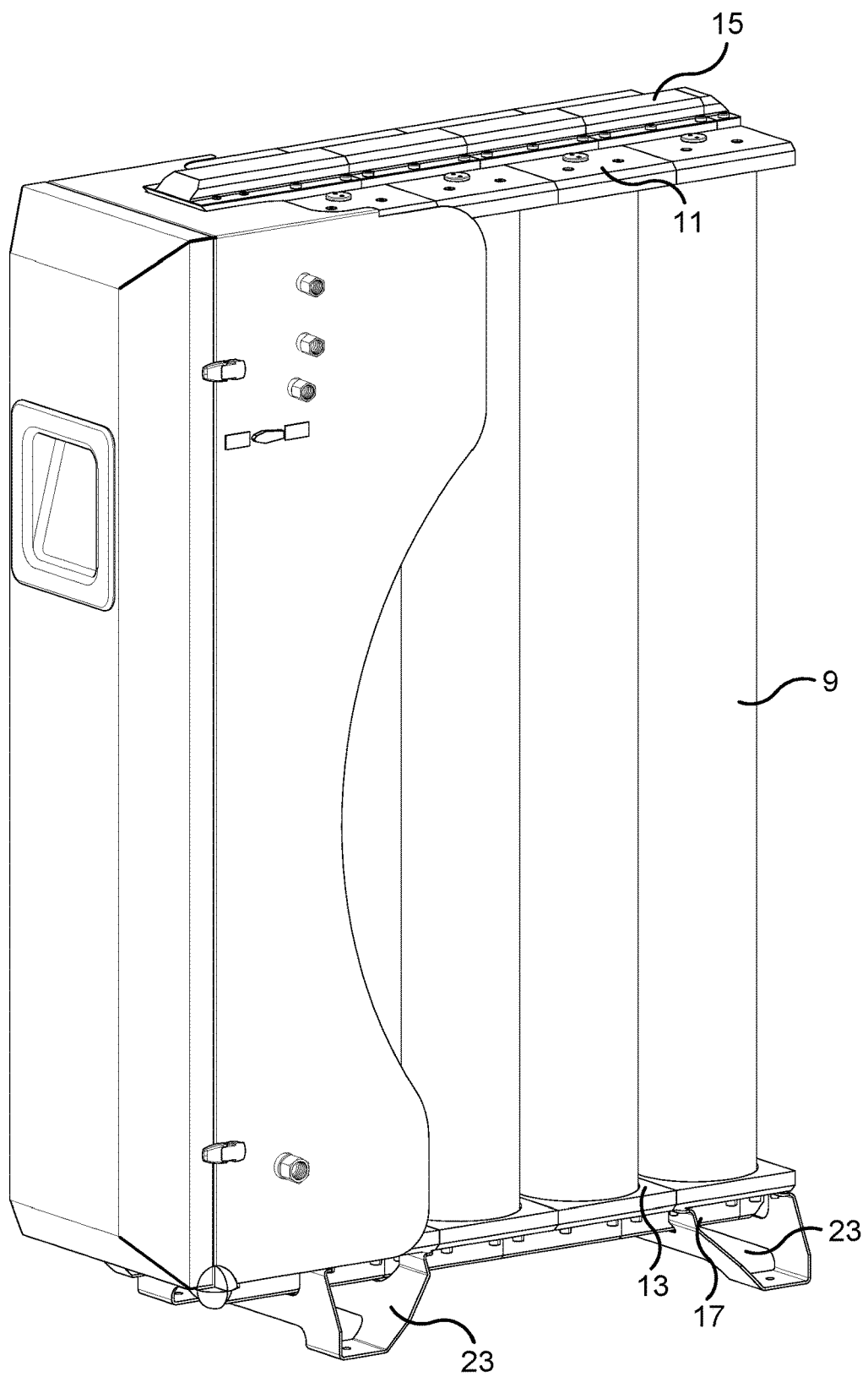
FIG. 1 provides a perspective view of a modular PSA system of the present invention, in which there are four pairs of towers.

FIG. 1 provides a perspective view of a modular PSA system of the present invention. The PSA system comprises a plurality of pairs of towers 9, which comprise the chambers, described above, within which the PSA process is conducted. The paired structure is most clearly shown in FIGS. 2 and 3, which show the system in different states of dis-assembly.

Each tower 9 includes a top header 11 and a bottom header 13. Attached to each top header 11 is a top header extension 15. Attached to each bottom header 13 is a bottom header extension 17. Each top header extension 17 defines a pair of conduit segments 19. Each bottom header extension defines a pair of conduit segments 21.

Each pair of towers is substantially similar to the other pairs. That is, the towers have the same dimensions, and the same headers and extensions. The only difference may be that tower pairs intended to be placed at the ends of the system may be provided with feet 23.

Figure 4:
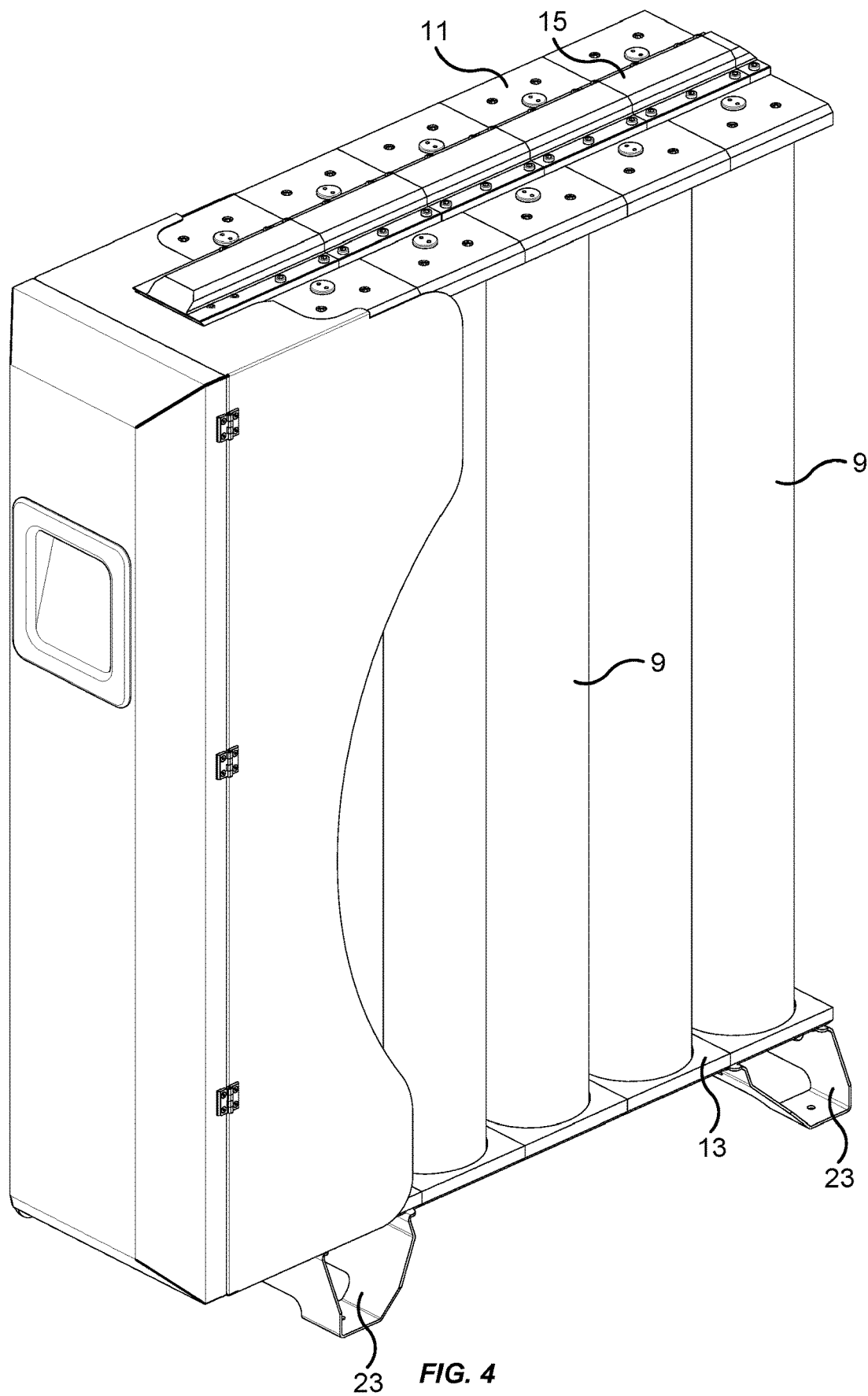
FIG. 4 provides a perspective view of a modular PSA system of the present invention, in which there are five pairs of towers, the figure showing more clearly the top headers and top header extensions for each pair, the headers being connected together.
Figure 5:
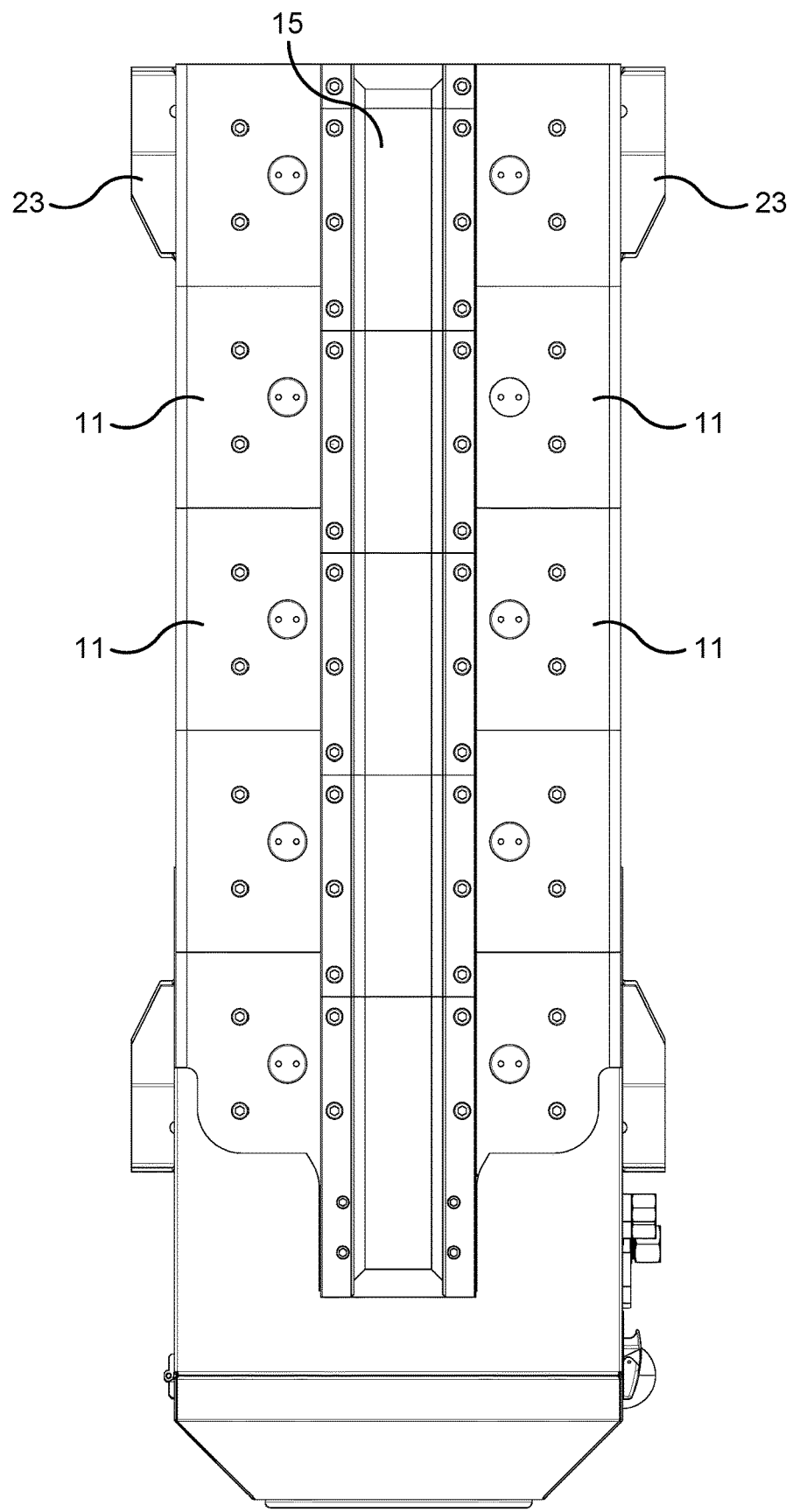
FIG. 5 provides a top view of a modular PSA system of the present invention, the figure showing the headers and header extensions for each of five pairs of towers.

The conduit segments 19 and 21 are positioned such that when multiple pairs of towers are assembled, as shown, for example, in FIGS. 1 and 4, the conduit segments are aligned so as to define a longer conduit spanning all of the pairs of towers. That is, the conduit segments combine to form single flow path for gas. This arrangement enables a feed gas to be distributed to multiple towers, in parallel, and for product gas to be withdrawn from multiple towers.

Figure 2:
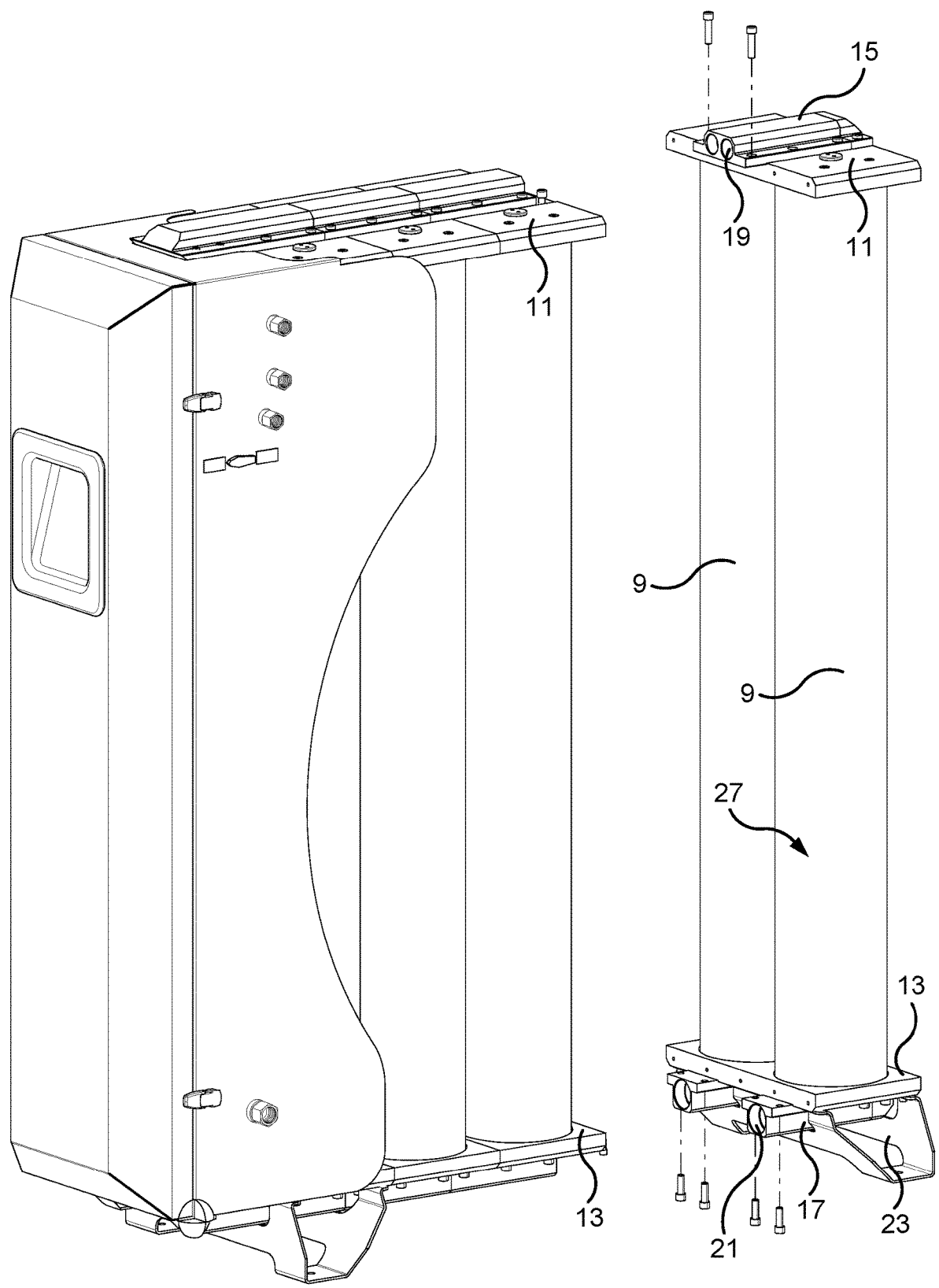
FIG. 2 provides a perspective view of a modular PSA system of the present invention, in which one pair of towers has been separated from the other pairs.
Figure 3:
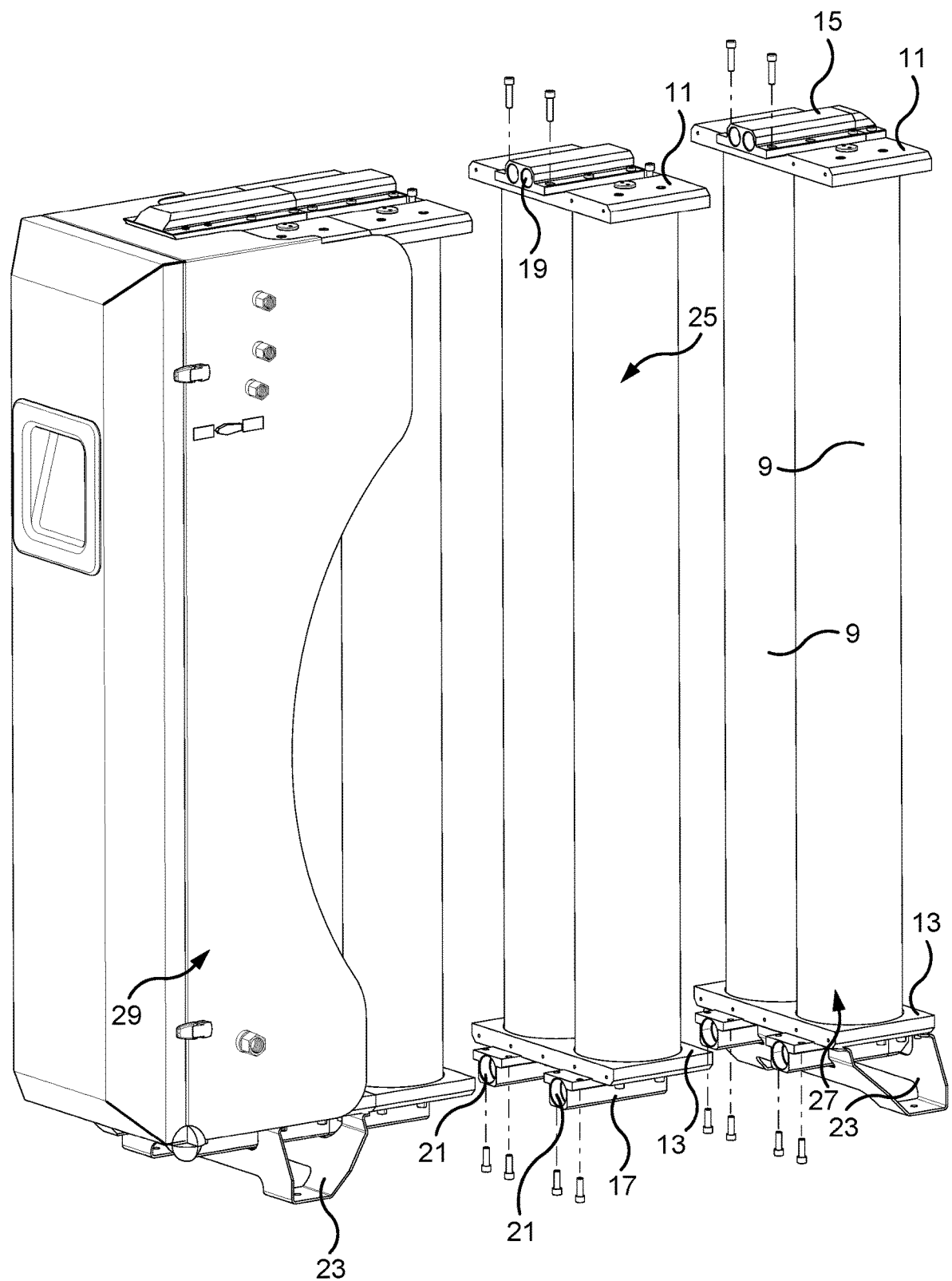
FIG. 3 provides a perspective view of a modular PSA system of the present invention, in which two pairs of towers have been separated from the other pairs.

FIGS. 2 and 3 illustrate a method of adding a pair of towers to the PSA system of the present invention. In FIG. 2, an end tower pair 27, having feet 23, is first removed from the other pairs of towers. This removal process requires only the removal of a small number of fasteners. Another pair 25 of towers is inserted between existing PSA system 29 and the end tower pair 27, as shown in FIG. 3. The pair 25 can then be affixed to the existing system 29, and the end tower pair 27 can then be reattached, to form the system shown in FIG. 4.

The procedure described above is preferred, because it maintains the feet on the end tower pairs, thereby enabling the towers to stand on a surface, thus providing maximum stability. But the invention is not limited to this arrangement, and it is possible to locate the feet on an internal tower pair.

Therefore, in its more general form, the method of modifying the size of a PSA system comprises providing a plurality of substantially similar pairs of towers, each tower comprising a chamber within which a PSA process can be conducted, positioning a new pair of towers alongside an existing pair or set of pairs of towers, while aligning the conduit segments of one pair with the conduit segments of the previous pair, and attaching the new pair of towers to the existing pair or pairs of towers, such that the conduit segments of the new pair and of the previous pair are aligned to define passageways spanning all of the pairs, so as to provide paths by which gas can be directed into the towers, and by which gas can be withdrawn from the towers. The method can be repeated with one or more additional pairs of towers, to create a PSA system having virtually any desired capacity.

The method can also be practiced in reverse, i.e. by removing one or more pairs of towers from an existing structure. When one or more pairs are removed, the remaining pairs of towers still have passageways spanning all of the set of pairs, except that such passageways are shortened due to the removal of one or more pairs.

The ends of passageways are provided with suitable end caps, or other structures (not shown), to seal the passageways, and to insure that the gases cannot escape to the outside.

Figure 6:
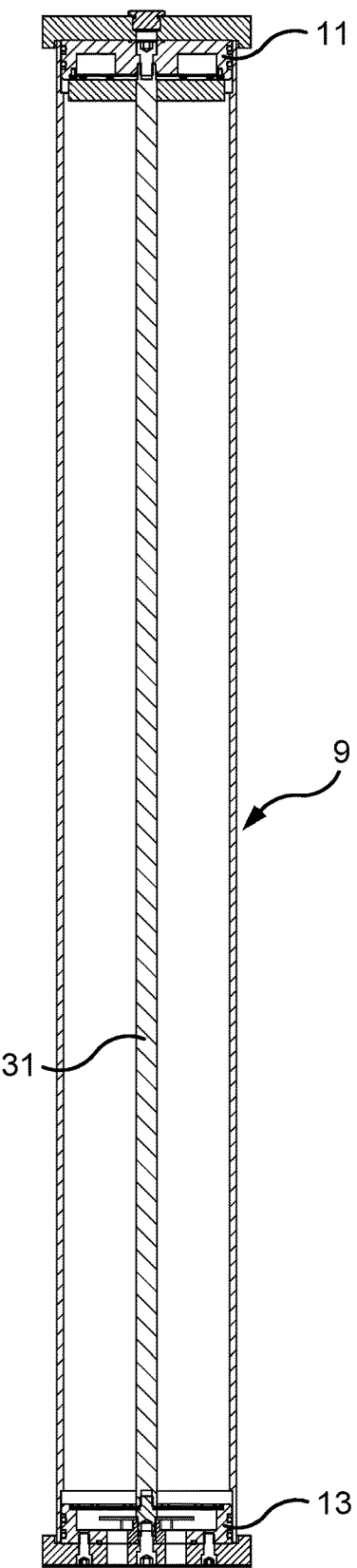
FIG. 6 provides an elevational view, in cross-section, showing the internal structure of one of the towers used in the modular PSA system of the present invention.

FIG. 6 provides an important detail of the internal structure of tower 9. Specifically, the tower includes tension rod 31, which is located inside the tower, and which extends from one end of the tower to the other. The tension rod is affixed to the top header 11 and the bottom header 13. The tension rod is preferably coupled to the headers by a threaded connection, such that the tension rod holds the headers together with substantial force. That is, the tension rod pulls the headers towards each other so as to provide a tight seal for the tower.

The tension rod structure makes it feasible to provide a tower having a wide variety of diameters, because whatever the diameter, the tower will be satisfactorily sealed by the fact that the headers are held together by virtue of the tension rod. This arrangement is particularly advantageous because one is not limited to the pipe sizes available from many extrusion providers, but one can instead use virtually any pipe, of virtually any diameter, in constructing the tower.

Figure 7:
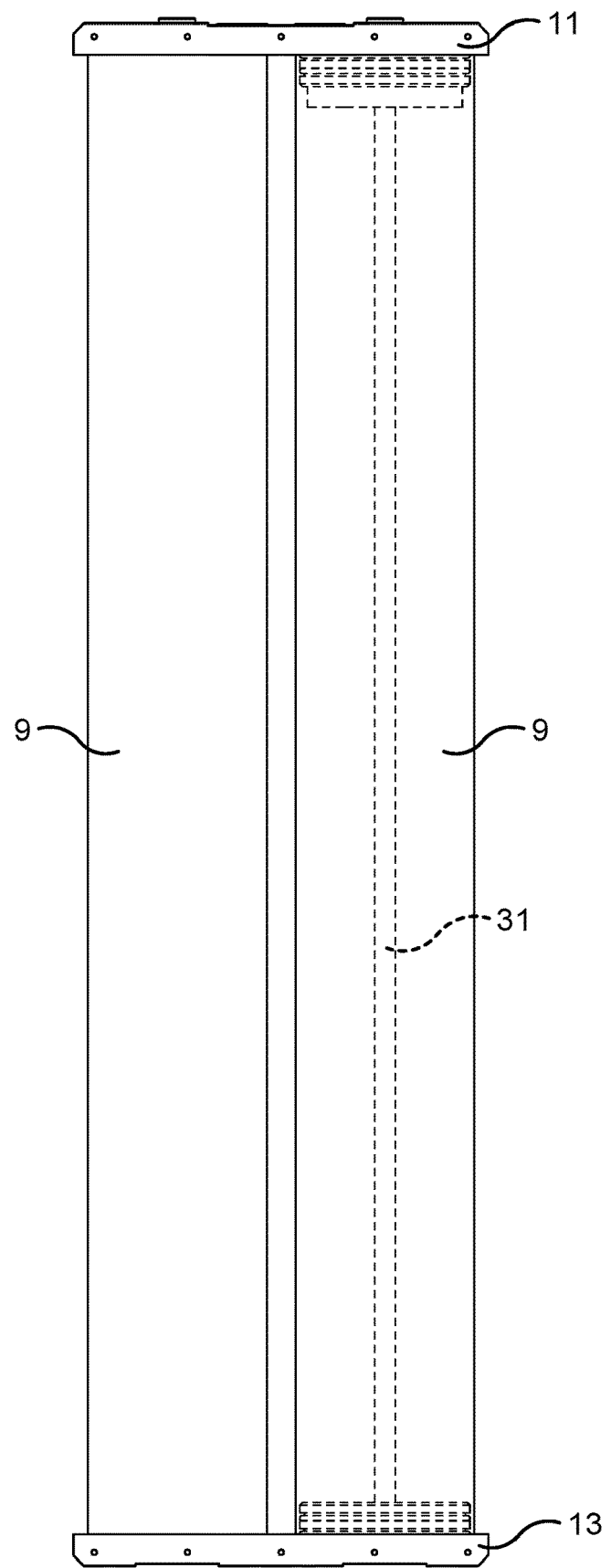
FIG. 7 provides an elevational view of a pair of towers, used in the modular PSA system of the present invention.

FIG. 7 shows a pair of towers 9, with some of the internal structure being shown for one of the towers. The tension rod 31 is held between the top header 11 and bottom header 13, as shown. The figure also shows, in a simplified view, the various structures provided near the headers, the details of which are shown in FIGS. 8 and 9.

Figure 8:
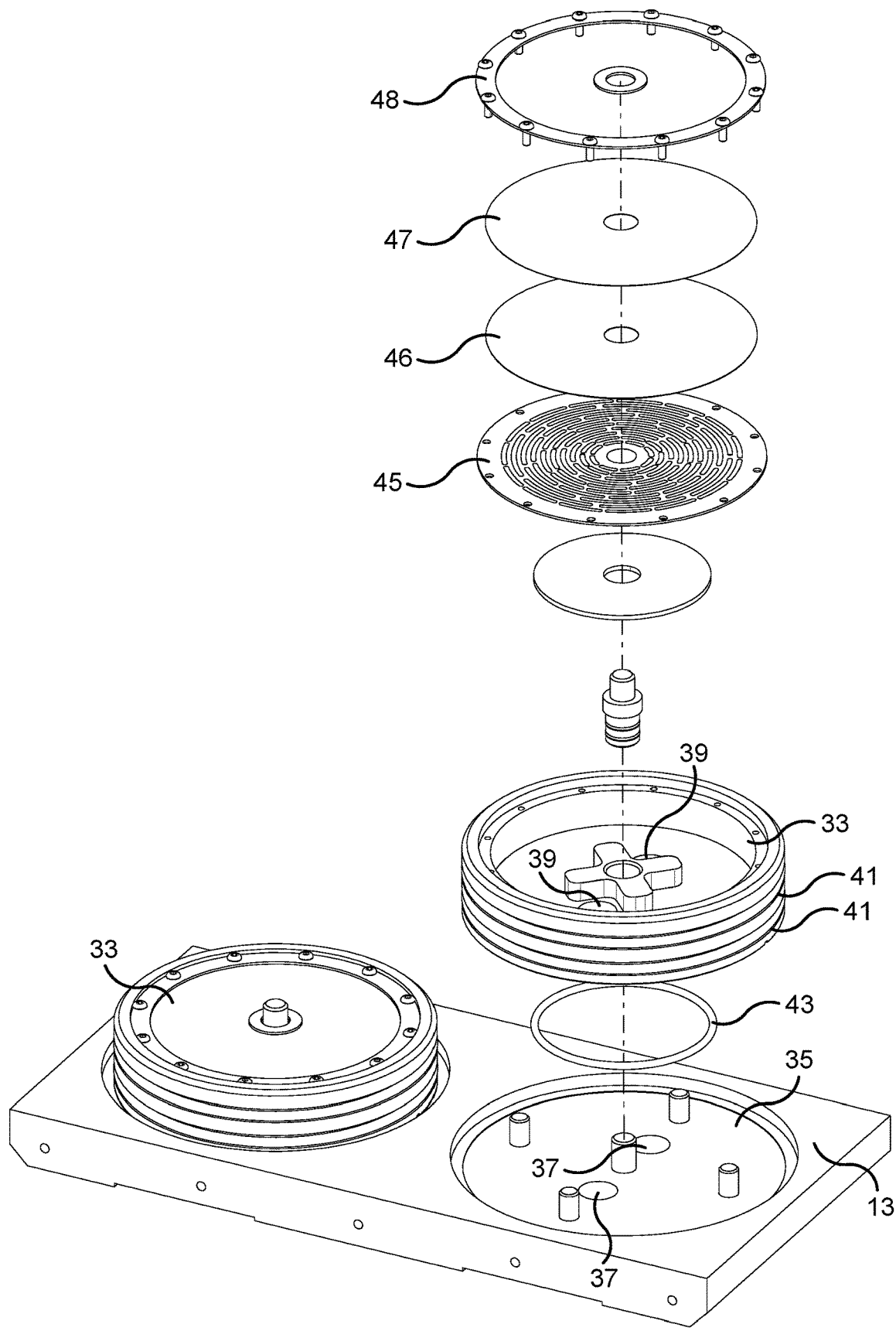
FIG. 8 provides an exploded perspective view of a bottom header, and the components used to join the bottom header to the tower, in the modular PSA system of the present invention.
Figure 9:
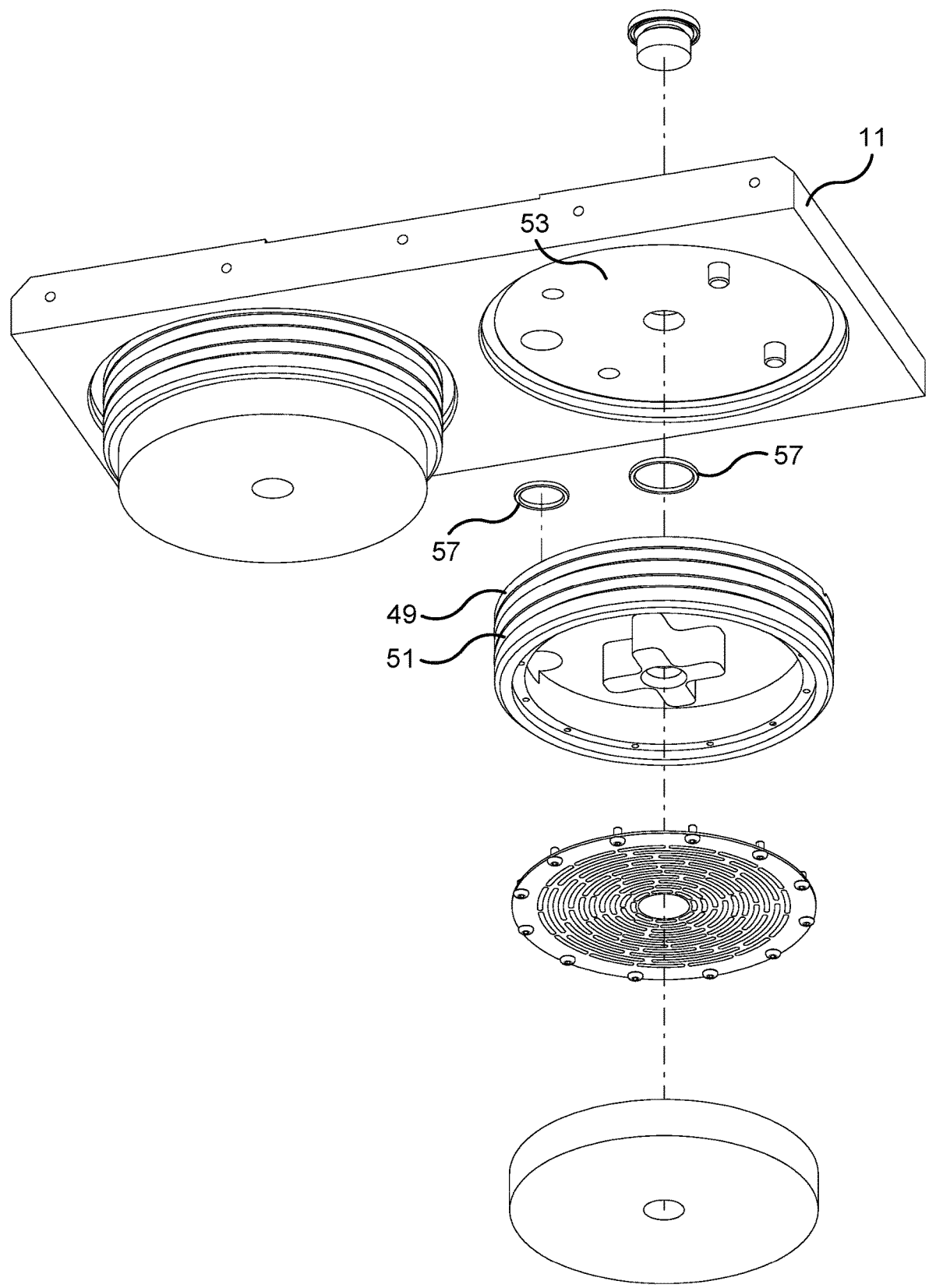
FIG. 9 provides an exploded perspective view of a top header, and the components used to join the top header to the tower, in the modular PSA system of the present invention.

FIG. 8 provides an exploded perspective view showing the various components attached to the bottom header 13 of each tower pair. Cylindrical housing 33 is intended to be inserted into corresponding recess 35 formed in the bottom header. The bottom header 13 includes gas inlet channels 37 which are aligned with gas inlet channels 39 in the housing 33. The housing is provided with O-rings 41. Also, O-ring 43 is positioned between the bottom header 13 and the housing 33.

The O-rings shown in FIG. 8 comprise gaskets which seal the connection of each tower to the top and bottom headers. Thus, each tower is sealed independently from all other towers. This feature makes it feasible to remove some pairs of towers without disturbing the seals of the other towers.

The assembly also includes impingement plate 45, coarse mesh screen 46, fine mesh screen 47, and retaining ring 48.

FIG. 9 provides an exploded perspective view of the various components attached to the top header 11 of each tower pair. Similar to the bottom header, there is a cylindrical housing 49 which defines gas collection channels, and which carries O-rings 51, and which fits within recess 53 formed in the top header. A compressible permeable material 55 is attached to an impingement plate 56, which is attached to the housing 49. O-rings 57 seal the connection between the housing 49 and the top header.

The sealing structure shown in FIGS. 8 and 9 insures that each tower pair is self-contained, and fully sealed, such that the tower pair can be removed from, or attached to, an existing system, without disturbing the sealing of the other pairs. That is, the sealing arrangement of the present invention essentially makes each tower pair independent, and therefore makes it feasible to attach or remove pairs of towers as desired.

Another feature of the present invention is the replacement of various pipes and conduits with one or more unitary blocks.

A PSA system includes means for directing gases into, and out of, both of the pair of towers, according to which tower is being pressurized and which tower is being depressurized. In the schematic diagram of FIG. 10, these means are illustrated by the conduits and valves shown in air control region 5, which control the flow of gas into the towers, and by the conduits and valves shown in nitrogen control region 7, which control the flow of gas out of the towers. The diagram of FIG. 10 can describe both a prior art PSA system, and the system of the present invention.

Figure 11:
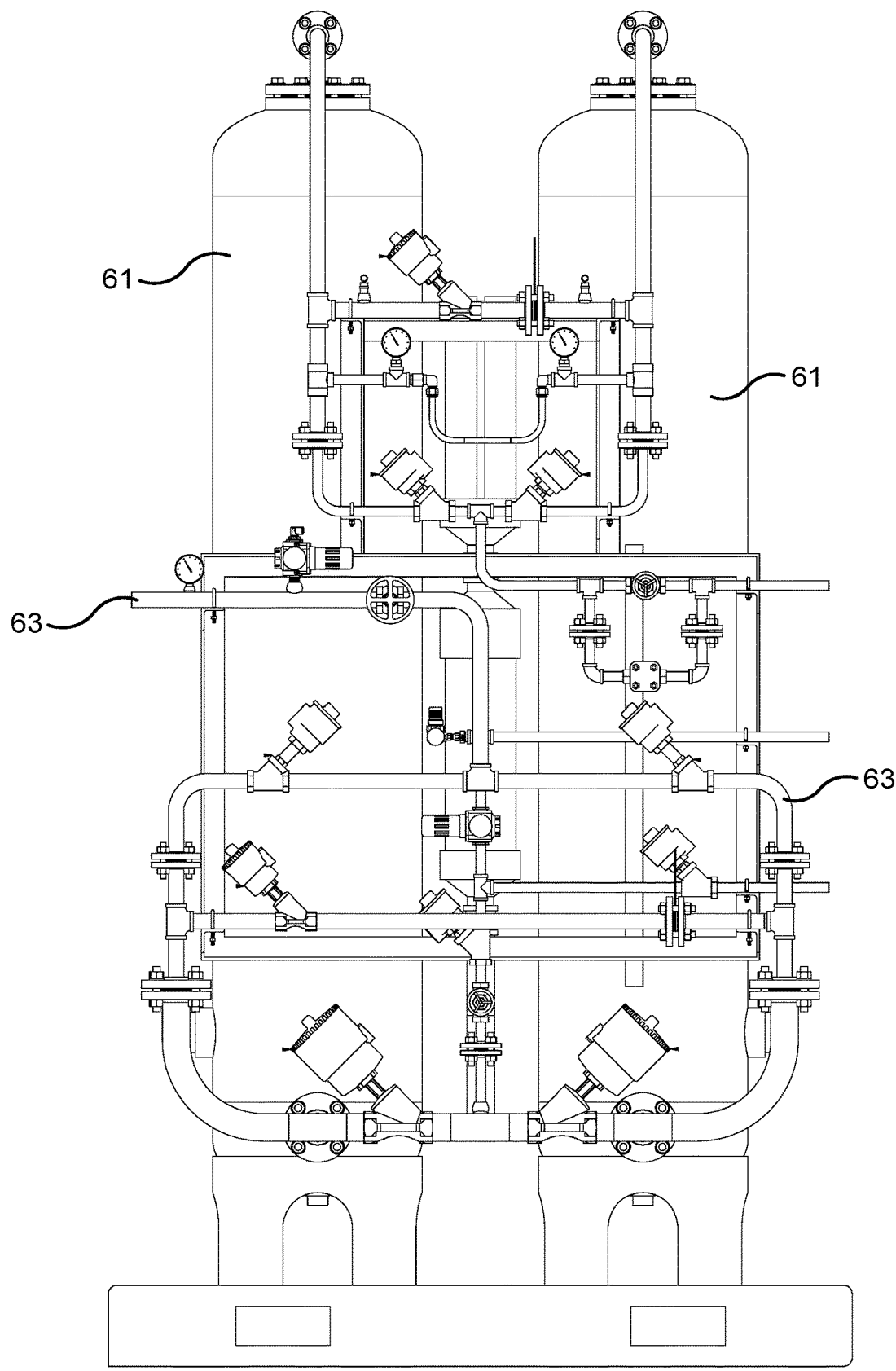
FIG. 11 provides an elevational view of a PSA system made according to the prior art.

For example, FIG. 11 shows an elevational view of a typical PSA system of the prior art. The PSA process is conducted within generally cylindrical chambers 61, and the apparatus includes a plurality of pipes 63, together with various valves and instruments, all disposed outside the chambers 61. That is, the means for directing gases into, or out of, the towers, comprise a complex network of pipes and valves, all of which are disposed outside the towers.

It will be appreciated that, at any given time, a substantial amount of gas may reside within the pipes disposed around the towers.

Figure 13:
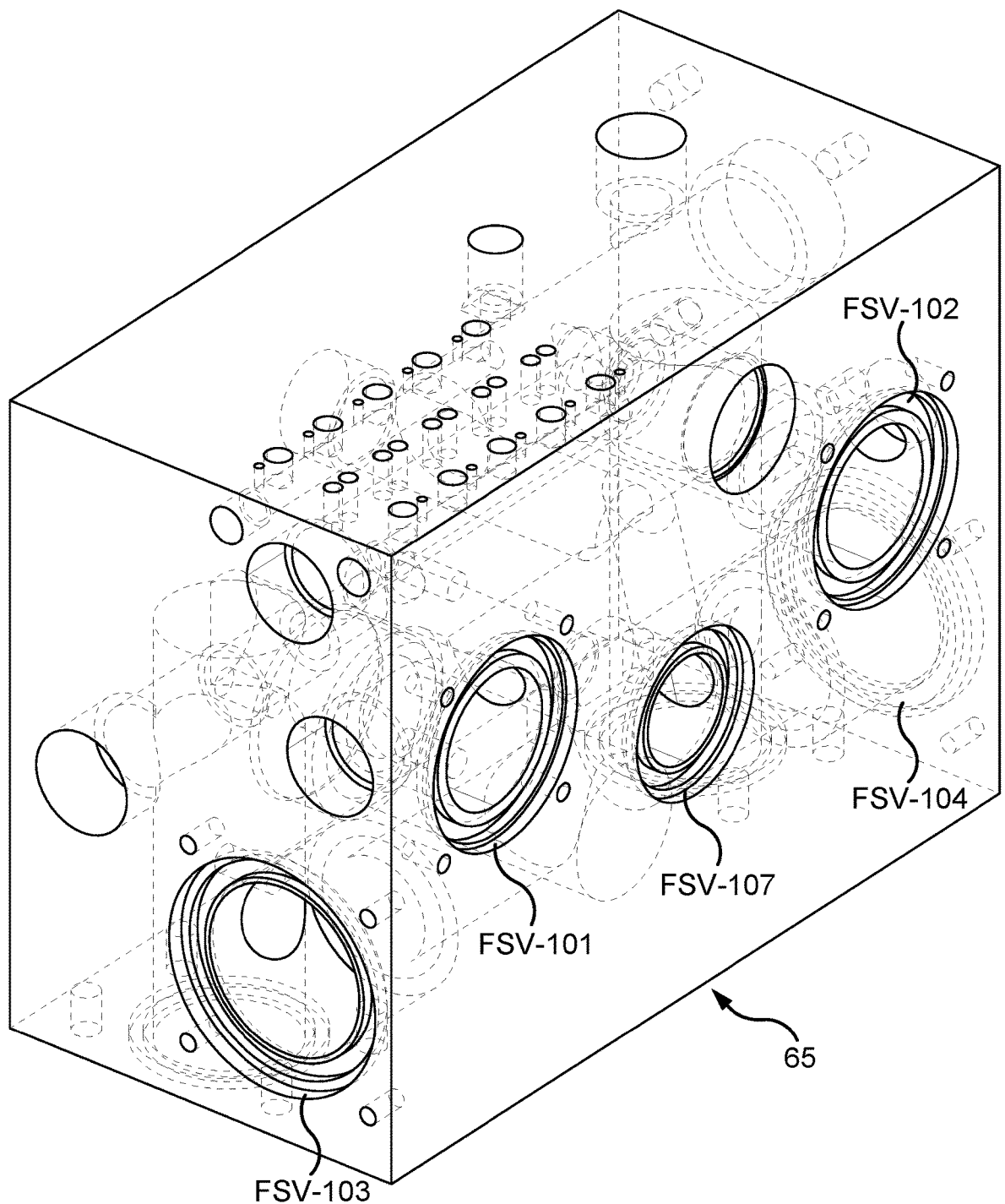
FIG. 13 provides a perspective view of a control block, used in the present invention, the control block taking the place of the piping shown in the prior art structure shown in FIG. 12.

The present invention replaces most or all of these pipes with a unitary block, preferably formed of metal, such as block 65 shown in FIG. 13.

In the case where the feed gas is air, which is to be separated into oxygen and nitrogen, with nitrogen being the main product, block 65 comprises an air control block. That is, block 65, and its associated valves (not shown in FIG. 13), controls the flow of air into the PSA system. The block defines a plurality of internal passages, and these passages provide paths for gas flow, and thereby take the place of the piping shown in FIGS. 11 and 12.

Thus, block 65, with its associated valves and instruments, performs the functions of air control block 5 of FIG. 10. Block 65 therefore comprises the means for directing gas into the towers.

The control blocks thus provide passageways for gases being directed to, or withdrawn from, the towers.

Figure 12:
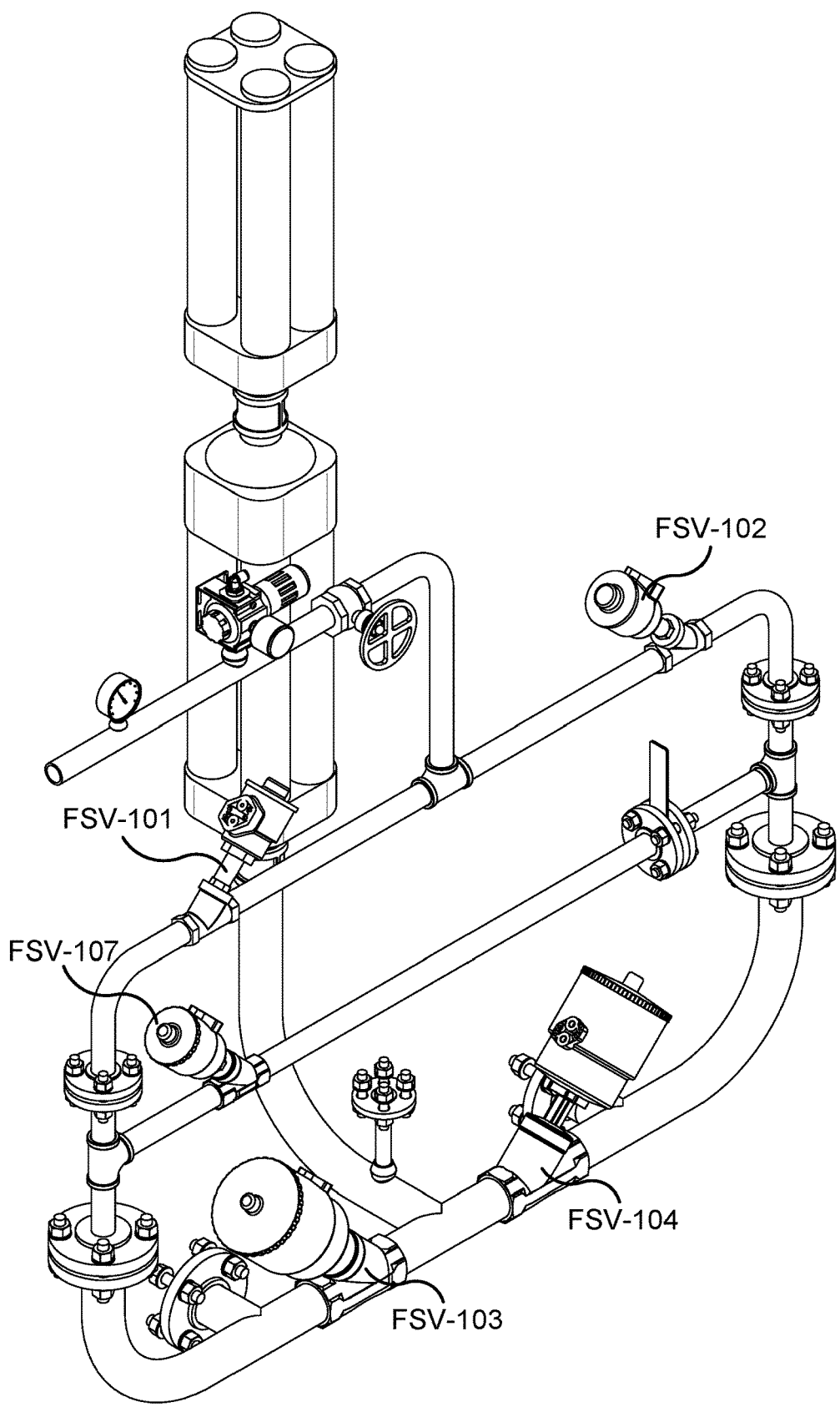
FIG. 12 provides a perspective view of piping and valves used in a PSA system of the prior art.

In the prior art arrangement shown in FIG. 12, the various flow switch valves are designated as FSV-101, FSV-102, etc., and these correspond to the similarly identified valves in the lower portion of the schematic diagram of FIG. 10. The same designations are used in FIG. 13 to indicate where the corresponding valves are connected to the block. FIG. 13 shows the block without any of the valves attached.

Figure 14:
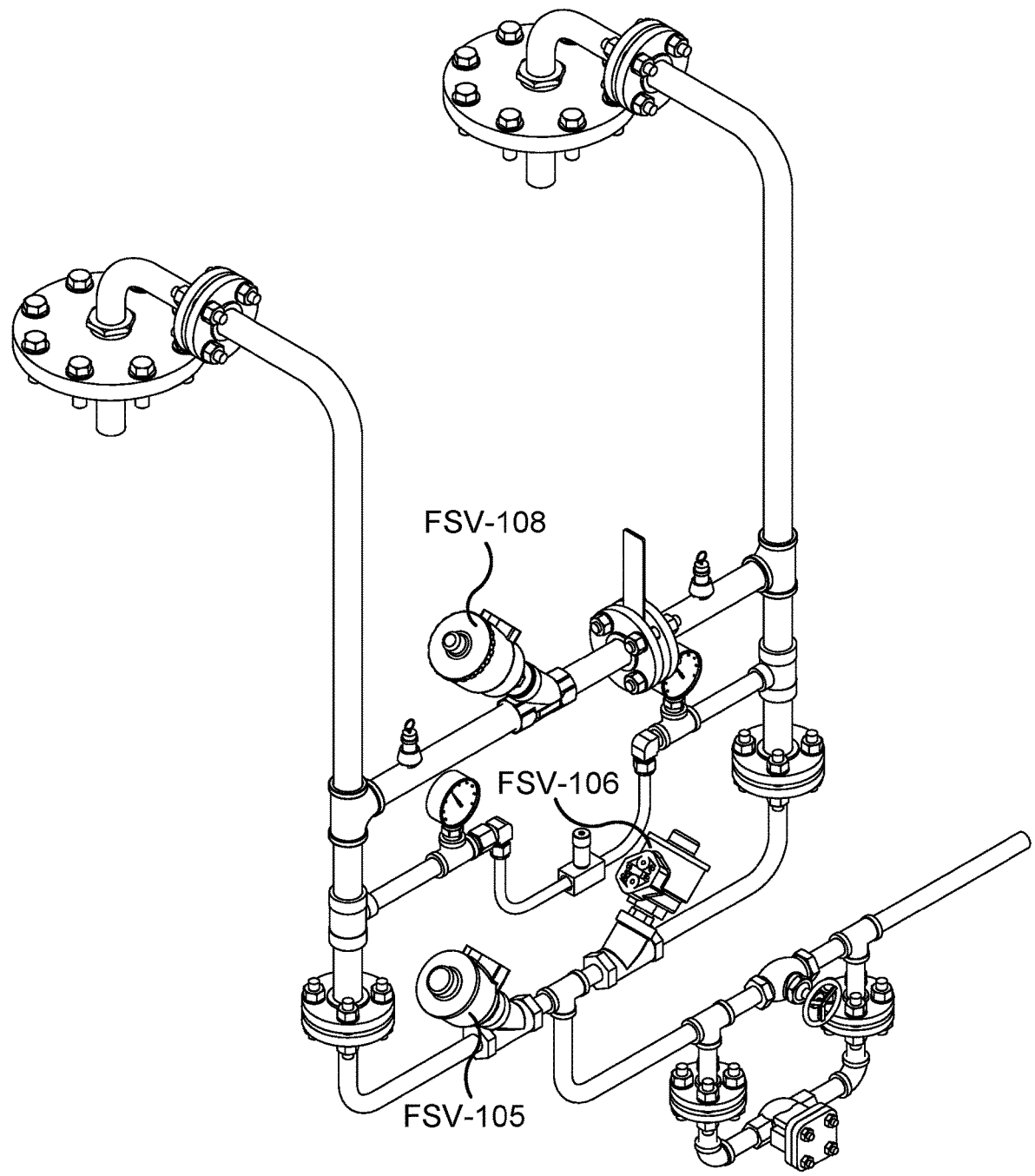
FIG. 14 provides a perspective view of more piping and valves used in a PSA system of the prior art.
Figure 15:
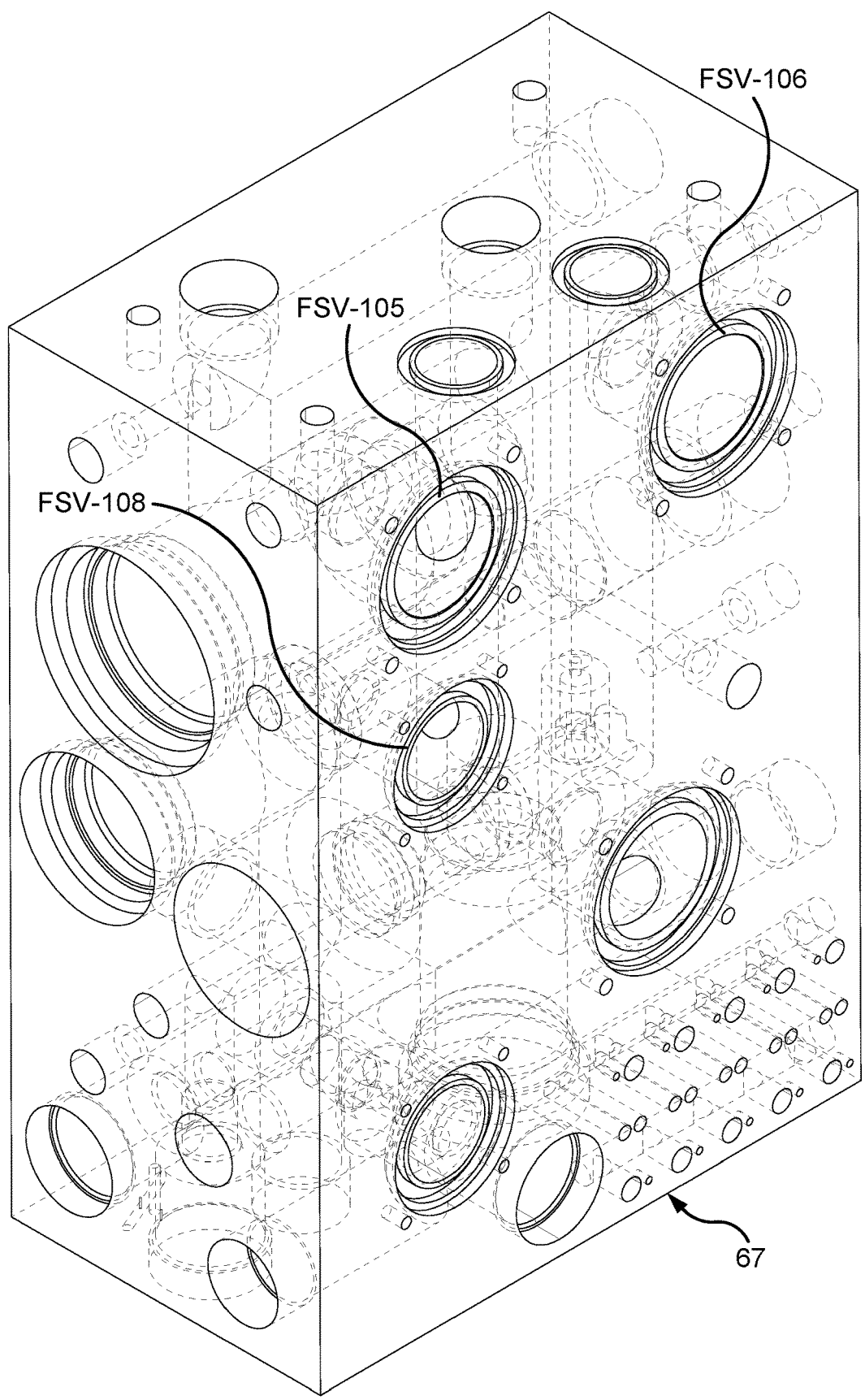
FIG. 15 provides a perspective view of a control block, used in the present invention, the control block taking the place of the piping shown in FIG. 14.

Similarly, FIG. 14 shows prior art piping which is used to control the flow of nitrogen, i.e. product gas, out of the PSA system. That is, the piping of FIG. 14 corresponds to that shown in nitrogen control block 7 of FIG. 10. This piping is replaced by nitrogen control block 67 of FIG. 15.

The valves identified as FSV-105, FSV-106, and FSV-108 of FIG. 14 correspond to the similarly designated valves in the nitrogen control block 7 of FIG. 10. Similar designations are used in FIG. 15, it again being understood that FIG. 15 shows the block without the valves and other instruments attached.

The replacement of various pipes and conduits with blocks in which the gas flow passages are integrally formed, achieves a substantial improvement in efficiency of operation. The use of the control blocks effectively reduces the volume of gas contained within the piping, and thereby minimizes the amount of gas that is wasted, i.e. that is not located within the towers and actually performing the steps of the PSA process.

Figure 16:
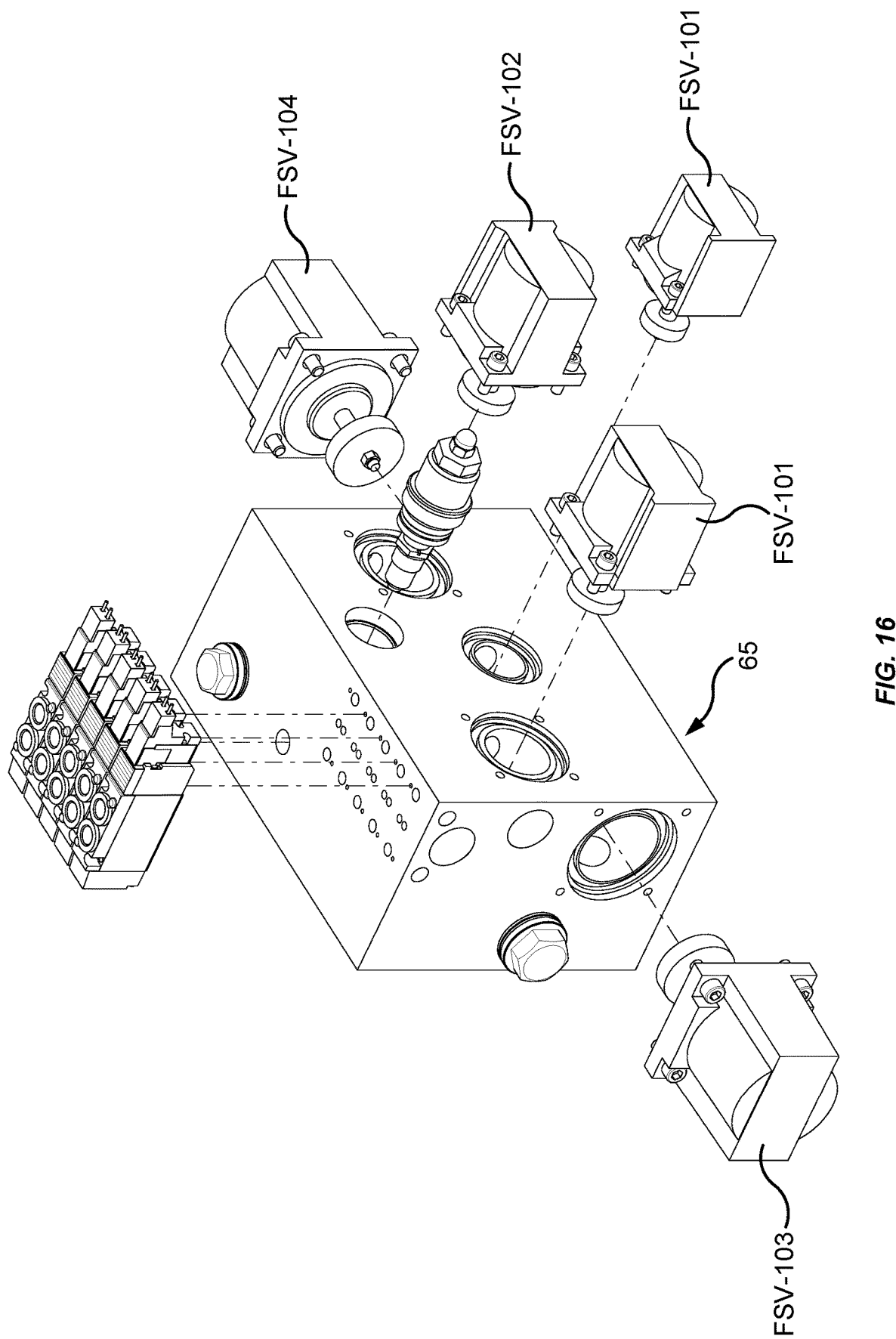
FIG. 16 provides an exploded perspective view of an air control block used in the present invention, and showing various instruments and valves which are inserted into, and/or attached to, the air control block.

The exploded perspective view of FIG. 16 shows air control block 65 with the various valves associated with the block. The valves associated with this block are labeled FSV-101, FSV-102, etc., and these correspond with the similarly labeled valves shown in the schematic diagram of FIG. 10.

Figure 17:
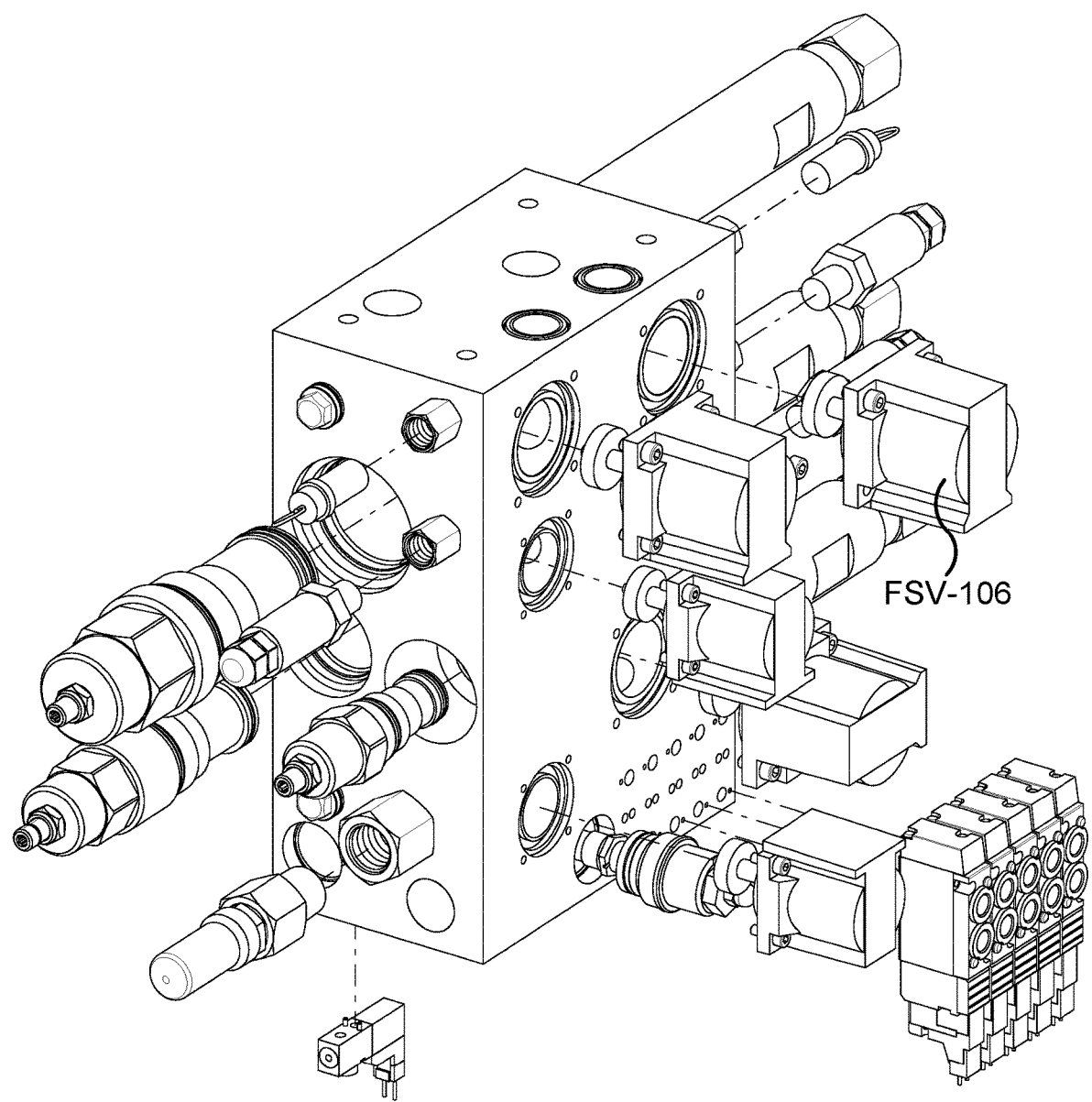
FIGS. 17 and 18 provide exploded perspective views, taken from different directions, showing a nitrogen control block used in the present invention, and also showing various instruments and valves which are inserted into, and/or attached to, the nitrogen control block.
Figure 18:
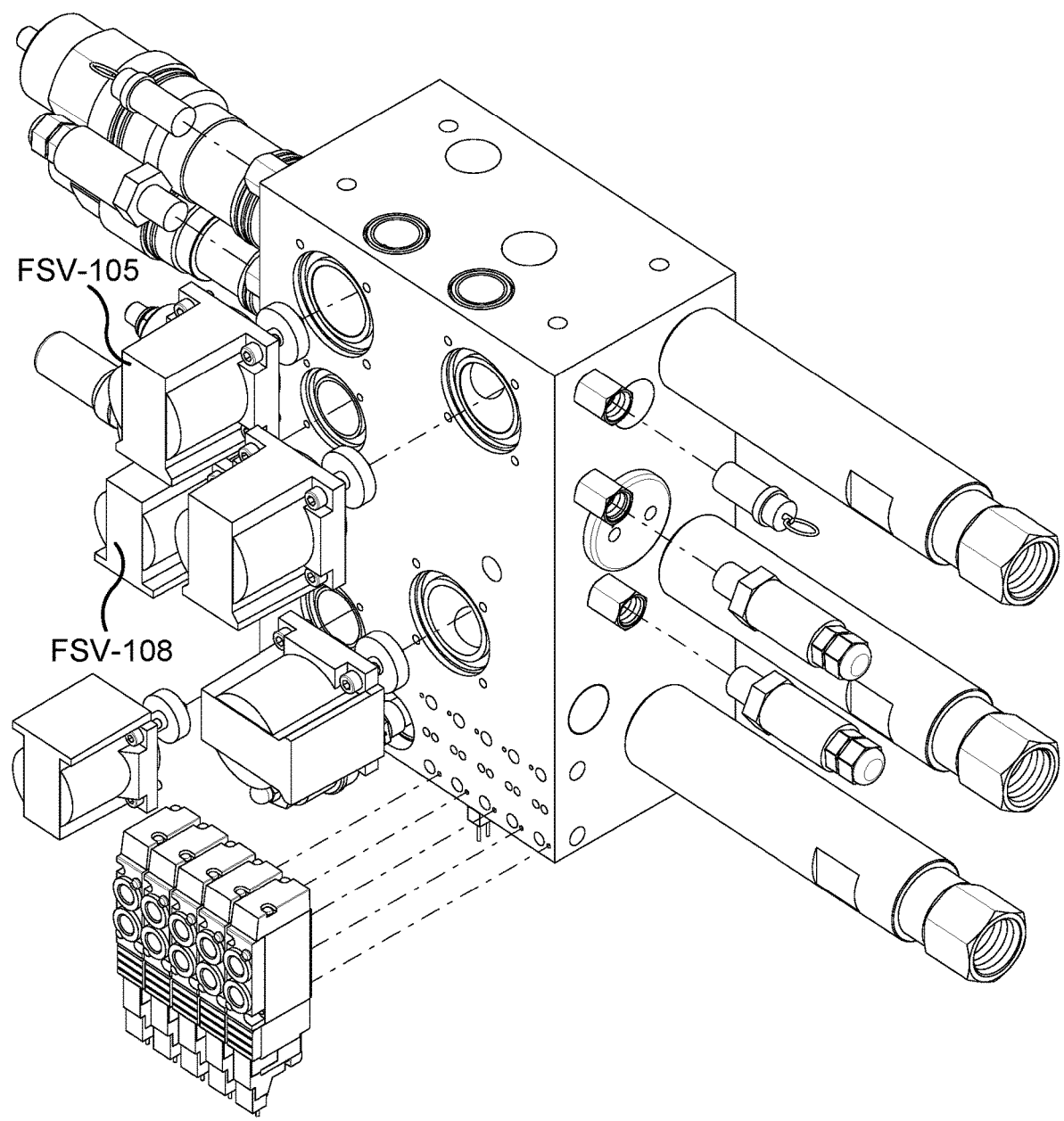

The nitrogen control block is shown, from two different viewpoints, in FIGS. 17 and 18. These figures also show, in exploded form, the various components that are inserted into the control blocks.

Figure 19:
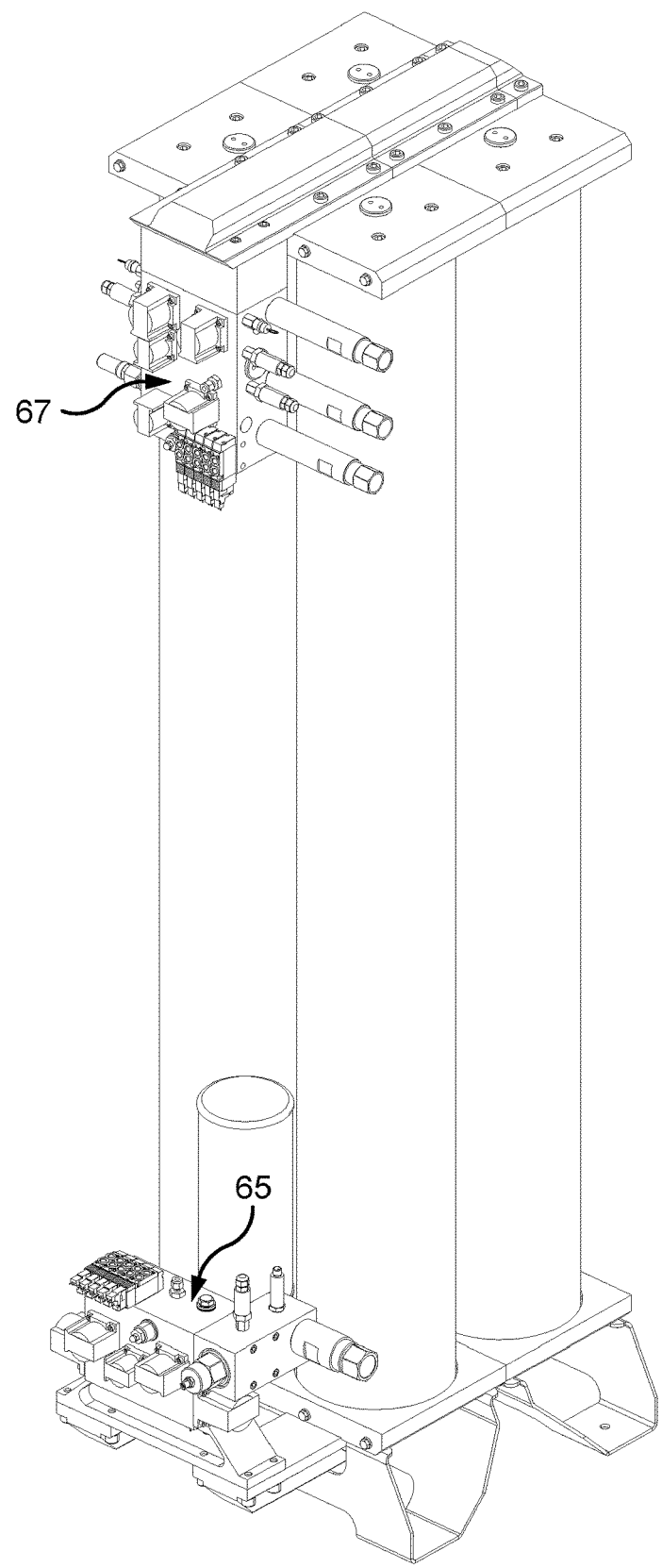
FIG. 19 provides a perspective view of a PSA system of the present invention, having two pairs of towers, wherein the figure shows the placement of the control blocks relative to the towers.

FIG. 19 shows a perspective view of a PSA system, having two pairs of towers, and showing the positioning of the control blocks. Specifically, the nitrogen control block 67 is positioned at the upper portion of the tower, and the air control block 65 is positioned at the lower portion of the tower. This arrangement is chosen because air is fed into the system from the bottom, and nitrogen is withdrawn from the system from the top. But other arrangements can be used, within the scope of the present invention.

The invention can be modified in various ways. As noted above, it is not limited to use for the separation of air, but could be practiced with other gases having a plurality of components. Such modifications should be considered within the spirit and scope of the following claims.

What is claimed is:

1. In a pressure-swing adsorption (PSA) system, the system comprising a pair of towers containing an adsorbent material to which a component of a feed gas becomes adsorbed under pressure, means for directing gases into, and out of, both of said pair of towers, according to which tower is being pressurized and which tower is being depressurized, wherein a component of the feed gas becomes adsorbed onto said material so that another component of the feed gas is allowed to exit the tower as a product gas, and wherein an adsorbed component of the feed gas is desorbed and allowed to exit the tower when pressure is reduced, the improvement wherein:
there are a plurality of substantially similar pairs of towers, each tower having a top header and a bottom header,
the top and bottom headers having extensions which define segments of conduits,
wherein a given pair of towers is connected to another pair of towers, wherein the conduit segments of both the top and bottom header extensions are aligned so as to form conduits spanning all of the pairs of towers,
wherein feed gas can be directed through one of said conduits so as to be fed into a plurality of towers in parallel, and wherein product gas can be directed out of a plurality of towers.

2. The improvement of claim 1, wherein each tower includes a tension rod, the tension rod being positioned inside the tower and being connected between the top and bottom headers, such that the tension rod pulls the headers towards each other so as to provide a tight seal for the tower.

3. The improvement of claim 2, wherein a gasket seals a connection of each tower to the top and bottom headers, wherein each tower is sealed independently from other towers.

4. The improvement of claim 1, wherein a gasket seals a connection of each tower to the top and bottom headers, wherein each tower is sealed independently from other towers.

5. The improvement of claim 1, wherein the directing means comprises at least one control block, the at least one control block defining passageways which provide paths for gas flow.

6. The improvement of claim 5, wherein the at least one control block is made of metal.

7. The improvement of claim 5, wherein the at least one control block includes a feed gas control block which provides passageways for a feed gas being directed into the towers, and a product gas control block which provides passageways for a product gas being withdrawn from the towers.

8. The improvement of claim 4, wherein the directing means comprises at least one control block, the at least one control block defining passageways which provide paths for gas flow.

9. The improvement of claim 8, wherein the at least one control block includes a feed gas control block which provides passageways for a feed gas being directed into the towers, and a product gas control block which provides passageways for a product gas being withdrawn from the towers.

10. The improvement of claim 9, wherein the towers have top and bottom ends, wherein feed gas is introduced near the bottom ends and wherein product gas is withdrawn near the top ends, and wherein the feed gas control block is positioned near the bottom end of a tower, and wherein the product gas control block is positioned near the top end of a tower.

11. The improvement of claim 10, wherein some of the towers include feet for enabling the towers to stand on a surface.

12. A method of modifying a size of a pressure-swing adsorption (PSA) system, comprising the steps of:
   a) providing a plurality of substantially similar pairs of towers, each tower comprising a chamber within which a PSA process can be conducted, each tower having top and bottom headers, the top and bottom headers having extensions which include conduit segments,
   b) positioning a first pair of towers alongside a second pair of towers, while aligning the conduit segments,
   c) attaching the first pair of towers to the second pair, wherein the conduit segments of the first and second pairs together define conduits spanning all of the pairs, to provide paths by which gas can be directed into the towers, and by which gas can be withdrawn from the towers.

13. The method of claim 12, further comprising repeating the method with one or more additional pairs of towers.

14. The method of claim 12, wherein the method includes positioning a tower pair having feet at an end location of the system.

15. The method of claim 12, wherein step (b) is preceded by removing a pair of towers from said plurality of towers, and wherein step (c) is followed by reattaching the removed pair of towers to the plurality of towers formed in step (c).

16. A pressure-swing adsorption (PSA) system, comprising:
   a) a plurality of substantially similar pairs of towers, each tower containing an adsorbent material to which a component of a feed gas becomes adsorbed under pressure,
   b) each tower having a top header and a bottom header, the top and bottom headers having extensions which define conduit segments,
   c) wherein the conduit segments are aligned so as to define a conduit which spans all of the pairs of towers, wherein feed gas can be directed through the conduit so as to be fed into a plurality of towers in parallel, and wherein product gas can be directed out of a plurality of towers,
   d) wherein each tower includes a tension rod, the tension rod being positioned inside the tower and being connected between the top and bottom headers, such that the tension rod pulls the headers towards each other so as to provide a tight seal for the tower,
   e) wherein a gasket seals a connection of each tower to the top and bottom headers, wherein each tower is sealed independently from other towers, and
   f) means for directing gases into, and out of, said pairs of towers, according to which tower in a pair is being pressurized and which tower is being depressurized, the directing means including at least one control block, located outside the towers, the control block defining passages for gas flow.

17. The system of claim 16, wherein the towers have top and bottom ends, wherein the directing means comprises a feed gas control block located near the bottom ends and wherein the directing means also comprises a product gas control block located near the top ends.

* * * * *